May 19, 1953  R. E. CLARRIDGE  2,638,919
APPARATUS FOR CONTROLLING A PROCESS
Filed Jan. 10, 1951  4 Sheets-Sheet 1

INVENTOR
RALPH E. CLARRIDGE
BY
D. Clyde Jones
ATTORNEY

May 19, 1953 R. E. CLARRIDGE 2,638,919
APPARATUS FOR CONTROLLING A PROCESS
Filed Jan. 10, 1951 4 Sheets-Sheet 2

INVENTOR
RALPH E. CLARRIDGE
BY
*D. Clyde Jones*
ATTORNEY

May 19, 1953 R. E. CLARRIDGE 2,638,919
APPARATUS FOR CONTROLLING A PROCESS
Filed Jan. 10, 1951 4 Sheets-Sheet 3

INVENTOR
RALPH E. CLARRIDGE
BY
D. Clyde Jones
ATTORNEY

May 19, 1953 R. E. CLARRIDGE 2,638,919
APPARATUS FOR CONTROLLING A PROCESS
Filed Jan. 10, 1951 4 Sheets-Sheet 4

INVENTOR
RALPH E. CLARRIDGE
BY
D. Clyde Jones
ATTORNEY

Patented May 19, 1953

2,638,919

UNITED STATES PATENT OFFICE 2,638,919

APPARATUS FOR CONTROLLING A PROCESS

Ralph E. Clarridge, Rochester, N. Y., assignor to Taylor Instrument Companies, Rochester, N. Y., a corporation of New York Application January 10, 1951, Serial No. 205,262

5 Claims. (Cl. 137—492)

This invention relates to a fluid-operated control system for controlling a process variable such as temperature, pressure, rate of flow, liquid level and the like, at a predetermined value.

Conventional controllers arranged to provide proportional response, especially if they are also arranged to provide a derivative response supplementing the proportional response, have been effective at the time of start-up of a process to bring the process medium promptly to the desired or set point value without overpeaking this value. However, controllers with these two responses fail to prevent "off-set," that is, they are unable to restore the process medium to the set-point value if there is a change in the demand or load on the process. Conventional controllers arranged to provide reset response have been especially effective in preventing off-set in the process value, due to load changes, but have the limitation of being completely unable to prevent "overpeaking." When a conventional controller is arranged to provide proportional response together with both derivative response and reset response, the off-set can be eliminated but the unavoidable interaction between the reset response and the other responses make the elimination of overpeaking impossible. This inability of a reset controller to start up a process without "overpeaking" has long been recognized as a serious limitation in automatic control systems. Consequently, it has long been the established standard practice in this art, that on highly exacting control processes subject to load changes, where off-set of the variable from the set point can not be tolerated, automatic reset must be provided. In this case automatic start-up without "overpeaking" is out of the question and instead start-up of the process must be controlled manually. On the other hand, on a process where "overpeaking" or "overshooting" the set point value during start-up, is dangerous or at least harmful of the product, proportional response or proportional plus derivative response must be used, but the desirable automatic reset response can not be used in combination therewith, with the result that all process load changes must be controlled manually.

It is the purpose of the present invention to provide an improved control system wherein proportional response, derivative response and reset response are used, in such a way that the automatic reset response does not dominate the other responses. Thus the control system can automatically compensate for load changes and the derivative response can be used so that the automatic control of the start-up of a process can be effected without "overpeaking" at the beginning of the process.

The various features and advantages of the invention will appear from the detailed description and claims when taken with the drawings in which:

Figure 1:
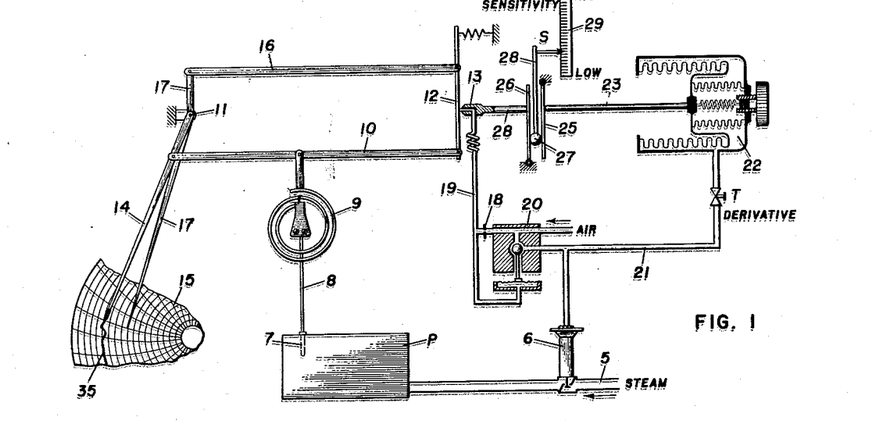
Fig. 1 is a diagrammatic showing of a conventional controller which is arranged to provide proportional response and also derivative response.

A conventional controller arranged to provide proportional response as well as a conventional controller providing proportional response plus derivative response, and a conventional controller providing all of these responses together, are all fully disclosed in the patent to Tate et al. Patent No. 2,361,885, granted October 31, 1944. However, for the purpose of discussing the present invention a simplified diagram of a proportional response controller in a temperature control system, is shown in Fig. 1. In this system, a process medium in a tank P is supplied with heat through a steam pipe 5 under control of a motor diaphragm valve 6. The temperature of the medium is sensed by a bulb 7 projecting therein. This bulb communicating through a capillary tube 8 with the fixed end of a Bourdon spring 9, constitutes a tube system which is filled with a thermosensitive fluid. As this fluid responds to a change in temperature at the bulb 7, the Bourdon spring correspondingly moves its free end and a link 10 connected thereto. The right end of the link 10 moves a baffle 12 with respect to a nozzle 13. Link 10 also moves a recording pen 14 with respect to the graduated chart 15, to provide an indication of the process temperature. The upper end of the baffle is connected by a link 16 to the upper end of a set pointer 17 pivoted at 11 for movement with respect to the chart 15. The setting of the pointer at a given temperature value on the chart 15 is effective through the link 16 to move the baffle to the desired set point position of the system. In accordance with the usual practice, a source of compressed air at a given pressure, for example, twenty pounds per square inch, is supplied through restriction 18 and pipe 19 to the nozzle 13 where it escapes to the atmosphere depending on the space relationship between the baffle 12 and the nozzle 13. If the process temperature measured by the bulb 7 increases above the set point, the Bourdon spring moves the baffle 12 towards the nozzle thereby tending to increase the back pressure in pipe 19. This tends to close a relay valve 20 which tends to supply its output at a decreased pressure. The output pressure of the relay valve 20 is applied through a feedback pipe 21 to a follow-up bellows 22. In response to the decreased pressure therein, the bellows 22 tends to move a rod 23 towards the right. This rod moves the nozzle away from the baffle an amount depending upon the setting of the sensitivity adjustment mechanism S to furnish an output porportional to the pen deviation from the set point. The sensitivity adjusting mechanism S includes hinged bars 25 and 26 which are so arranged that as a fulcrum 27 connected to a rod 28 is moved vertically, the sensitivity of the controller can be changed as indicated by a graduated scale 29. When the temperature at the bulb 7 drops the controller acts in a similar manner but in the reverse sense tending to open the control valve to introduce more steam into the process.

As herein illustrated, the feedback pipe 21 has an adjustable needle valve T therein. When the controller of Fig. 1 is arranged to provide proportional response only, this valve is opened wide so that it has no effect on the operation of the system. However, when this controller is adjusted to provide a proportional response plus a derivative response, the needle valve is manipulated to restrict the flow through the pipe 21 into bellows 22. This needle valve together with the capacity of the follow-up bellows 22 or with a capacity (not shown) supplementing that of the bellows, if desired, provides the derivative response.

The proportional controller

For simplicity of description assume that the heat input to the process through pipe 5 is proportional to the opening of valve 6. Also assume that the process is operating at a 50% load condition so that the valve 6 will remain one-half open to maintain the process temperature at the set point. To explain the action of the various controller responses, a proportional band will be shown in relation to the process temperature record. Since sensitivity is control valve movement per pen movement, it follows that the pen of a controller set at a high sensitivity would have to move but a small amount for full valve travel. Conversely, at a low sensitivity, the pen would have to move through a much greater distance for the full valve travel. Thus the proportional band of a controller is the distance the pen moves to cause the valve to move from its open to its closed position.

Figures 2, 2A:
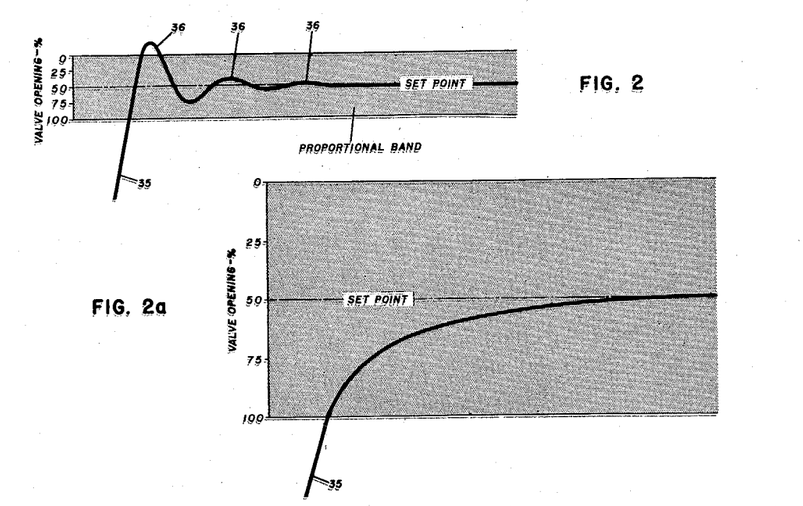
Figs. 2, 2A and 3 are charts useful in explaining the invention.

When a conventional proportional controller such as illustrated in Fig. 1 (with needle valve T open) is adjusted to a reasonably narrow band to minimize the effect of load changes, the temperature record at the time of start-up might be very similar to that shown in the chart of Fig. 2. Note that the shaded area, that is the proportional band, extends from the temperature corresponding to the open valve position to that of the closed valve position. In this and subsequent charts with the exception of Fig. 9, the position of the temperature graph 35 in the band at any time indicates the opening of the valve. It will be noted in Fig. 2 that overpeaking occurs especially as indicated at 36 and if this must be avoided, the proportional band can be widened as illustrated in Fig. 2A by lowering the setting of the sensitivity by adjusting the mechanism S, Fig. 1. While this eliminates the overpeaking, this adjustment of the controller is often unsatisfactory because it takes the temperature too long to come in to the set point and also because the off-set following a load change is greater at low sensitivities, the off-set being directly proportional to the band width and inversely proportional to the sensitivity. The equation most often used to express the action of a controller of this kind is (1) $$p - p_0 = S(x - x_0)$$

or $$\frac{dp}{dt} = S\frac{dx}{dt}$$

$(p - p_0)$ or $\frac{dp}{dt}$—Change in output pressure of the controller.

$(x - x_0)$ or $\frac{dx}{dt}$—Change in the input to the controller, change in the controller variable.

$S$—Constant relating the output to the input of the controller.

The proportional plus derivative controller

Figure 3:
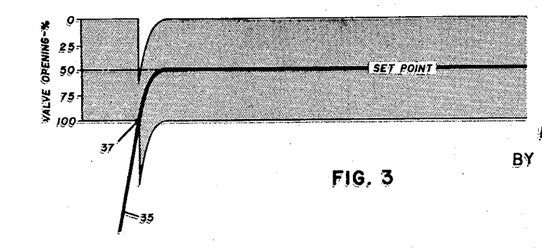

If derivative response is added to the proportional response controller shown in Fig. 1 by restricting the flow through the needle valve T in the feedback pipe 21 thereof, the start-up characteristics can be materially improved. The derivative function has a stabilizing effect and with a given band width, it reduces the tendency of the controller to oscillate. For example, in Fig. 3 sufficient derivative has been added to prevent over-peaking. If the proportional band is used to show valve position, the band shifts downward at the time the process temperature reaches point 37 at the lower edge of the band. Note that as soon as the temperature reaches the proportional band, the derivative response increases the output pressure sufficiently to cause the valve to be approximately 35% open. The amount of shift of the band is determined by the setting of needle valve T. The equation most often used to express this type of performance as illustrated in Fig. 3, is (2) $$p - p_0 = S(x - x_0) + ST\frac{dx}{dt}$$

or $$\frac{dp}{dt} = S\frac{dx}{dt} + ST\frac{d^2x}{dt^2}$$

$(p - p_0)$ or $\frac{dp}{dt}$—Change in output pressure of the controller.

$(x - x_0)$ or $\frac{dx}{dt}$—Change in the input to the controller, the change in the controlled variable.

$S, T$—Constants relating the output to the input of the controller, the controller adjustments.

The proportional plus reset controller

Figure 4:
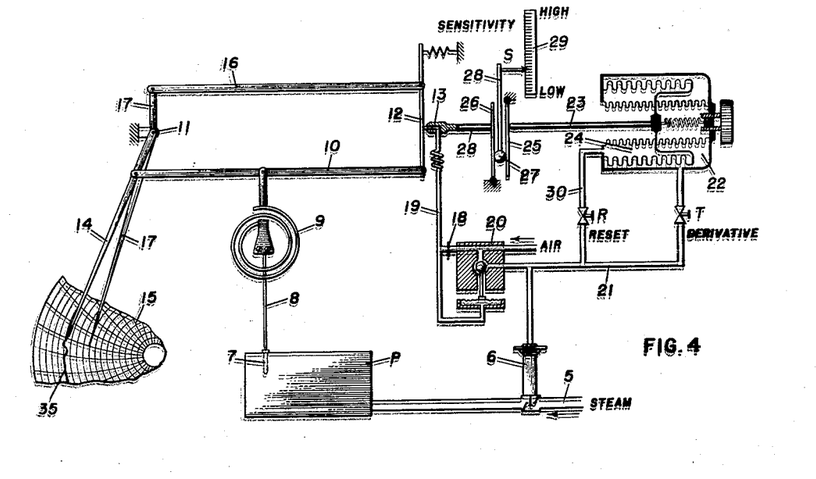
Fig. 4 is a diagrammatic showing of a conventional controller of the motion balance type arranged to provide proportional respnose, derivative response and reset response.

In Fig. 4, there is diagrammatically illustrated a control system that can be arranged to provide proportional response plus reset response or proportional response plus derivative response (sometimes referred to as "Pre-Act"), plus reset response.

This system differs from that shown in Fig. 1 in that the bellows 22 is opposed by a bellows 24 so that the action of rod 23 in positioning the nozzle 13, is governed by the joint action of this pair of bellows. The output pressure of the relay valve 20 is applied through the feedback pipe 21 and a branch pipe 30 to the bellows 24. Reset response is accomplished by restricting the flow through the adjustable needle valve R in the pipe 30. When the controller is to be used with only proportional plus reset responses, adjustable needle valve T is opened wide so that it has no effect on the operation of the circuit, since at this time it does not restrict the flow through the pipe 21 into bellows 22.

Figure 5:
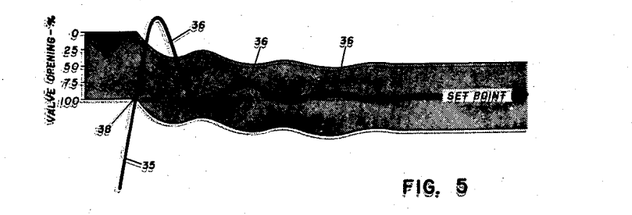
Figs. 5 and 6 are charts useful in pointing out the deficiencies in the conventional controller of Fig. 4.

When automatic reset response is added to the proportional response in the controller, the start-up temperature record may be very similar to that illustrated in Fig. 5. Note that the proportional band is entirely above the control point during the start-up period and that it does not begin to shift downward until the temperature reaches the set point at 38. Due to the fact there is no action until the set point is reached, the over-peaking is considerably worse than it was before the automatic reset feature was added. However any off-set due to process load changes are eliminated by the use of the reset response. If the instrument sensitivity were lowered with the resultant widening of the proportional band as was done in Fig. 2A, the over-peaking will become worse rather than better. This is due to the fact that the band becomes wider on the upper side of the set point, and therefore, the rising temperature will make a greater excursion into this band before the shift of the band returns the variable to the set point. There has been no satisfactory method suggested for eliminating this over-peaking when the proportional and automatic reset responses alone are used. The equation for this controller is $$(3) \quad \frac{dp}{dt} = SR(x - x_0) + \frac{dx}{dt}$$

$\frac{dp}{dt}$—The rate of change of output pressure of the controller.

$(x - x_0)$—The change in the controlled variable.

$\frac{dx}{dt}$—The rate of change of the controlled variable.

$S, R$—Constants determining the magnitude of the control effects, the controller adjustments.

The conventional controller with the three responses

When the controller illustrated in Fig. 4 is arranged to provide proportional plus reset plus derivative responses, the needle valve T is not opened wide but is manipulated to restrict the flow from pipe 21 into bellows 22 to provide the derivative response. The start-up temperature record of a controller with the three responses may be very similar to that illustrated in Fig. 6. Note that the automatic reset function still dominates the proportional band and places it above the set point during the start-up period. Since the derivative function does not begin to act until the set point is reached, over-peaking can not be eliminated, although it can be reduced.

Figure 6:
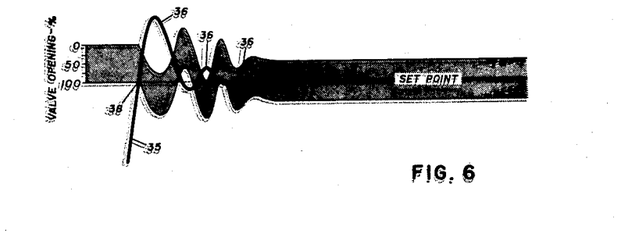

The equation most often used to describe mathematically, the performance shown in Fig. 6, is $$(4) \quad \frac{dp}{dt} = \overline{SR}(x - x_0) + \overline{S}\frac{dx}{dt} + \overline{ST}\frac{d^2x}{dt^2} = \overline{S}\left[\overline{R}(x - x_0) + \frac{dx}{dt} + \overline{T}\frac{d^2x}{dt^2}\right]$$

It will be noted that this equation is obtained by adding the three responses. However, the mechanism herein illustrated and others which have been used in conventional control systems do not produce results which correspond to this equation.

To illustrate this, refer to Fig. 4 which is a schematic diagram of the pneumatic circuits used in some of the conventional controllers. As the temperature increases, the Bourdon tube moves the baffle 12 towards the nozzle 13, thereby increasing the nozzle back pressure and actuating the relay valve 20. Since the relay is reverse acting, the output pressure diminishes. If the reset restriction R is closed ($R=0$) with the output pressure, given when pen and set pointer are together, locked in the bellows chamber 24 and the derivative restriction T is open ($T=0$), the falling output pressure in the bellows chamber 22 moves the nozzle to the right thereby causing the nozzle to move in a direction to increase the original nozzle-baffle spacing due to the change in the variable. If for a given output pressure change in the bellows chamber 22 the nozzle movement is large due to the sensitivity adjustment S, the instrument sensitivity is low and its proportional band is wide. On the other hand, if the nozzle motion for a given output pressure change is reduced by the sensitivity adjustment S, the controller sensitivity is high and the proportional band is narrow. The automatic reset response is added by opening the reset restriction R so that over a period of time, this pneumatic sensitivity reduction is canceled. In other words, the pressure change in the bellows chamber 22 is canceled by a corresponding pressure change in the bellows chamber 24 so that the nozzle is restored to its original position and the temperature is restored to the set point. As the derivative restriction T is gradually closed, the pressure on the control valve 6 must lead the pressure in the bellows chamber 22 by an amount depending upon the restriction. A study of the circuit will show that the magnitude of this lead is dependent upon the rate of change of the controlled variable, but the lead time is primarily a function of the restriction T.

Next, consider the adjustments of this controller S, R and T. First, set R equal to infinity (open the restriction or needle valve) and T equal to zero (open the restriction or needle valve). Since the output pressure enters both the bellows 22 and 24, the nozzle does not move and the controller has a high sensitivity. When R and T are closed equal amounts (the product of RT equals 1), and again the nozzle does not move and the controller remains in a high sensitivity. While this is known to be the fact from this analysis of the controller circuits as well as from actual observation, this is not indicated by Equation 4. Therefore, Equation 4 does not apply to this particular controller. Without going through the mathematical details, the equation which describes the action of the controller of Fig. 4 with reasonable accuracy is (5)
$$\frac{dp}{dt}=\frac{(1+RT)}{(1-RT)}S\left[\frac{R}{1+RT}(x-x_0)+\frac{dx}{dt}+\frac{T}{1+RT}\frac{d^2x}{dt^2}\right]$$

Let this equation be examined to determine how well it fits the observed results. First, set $T=0$, whereupon the equation becomes identical with Equation 4. In other words, the instrument behaves in an orthodox manner with the proportional and automatic reset responses. When the reset restriction R is closed ($R=0$) Equation 5 becomes Equation 2, and again the instrument behaves in an expected fashion. If the product of $RT=1$, $$\frac{1+RT}{1-RT}$$

becomes infinite indicating that the sensitivity of the controller is extremely high. This corresponds with the observed results. Therefore, while it has not been proven that Equation 5 is a good mathematical description of the controller shown in Fig. 4, it appears to correspond with the observed results and this can be verified mathematically.

Figure 7:
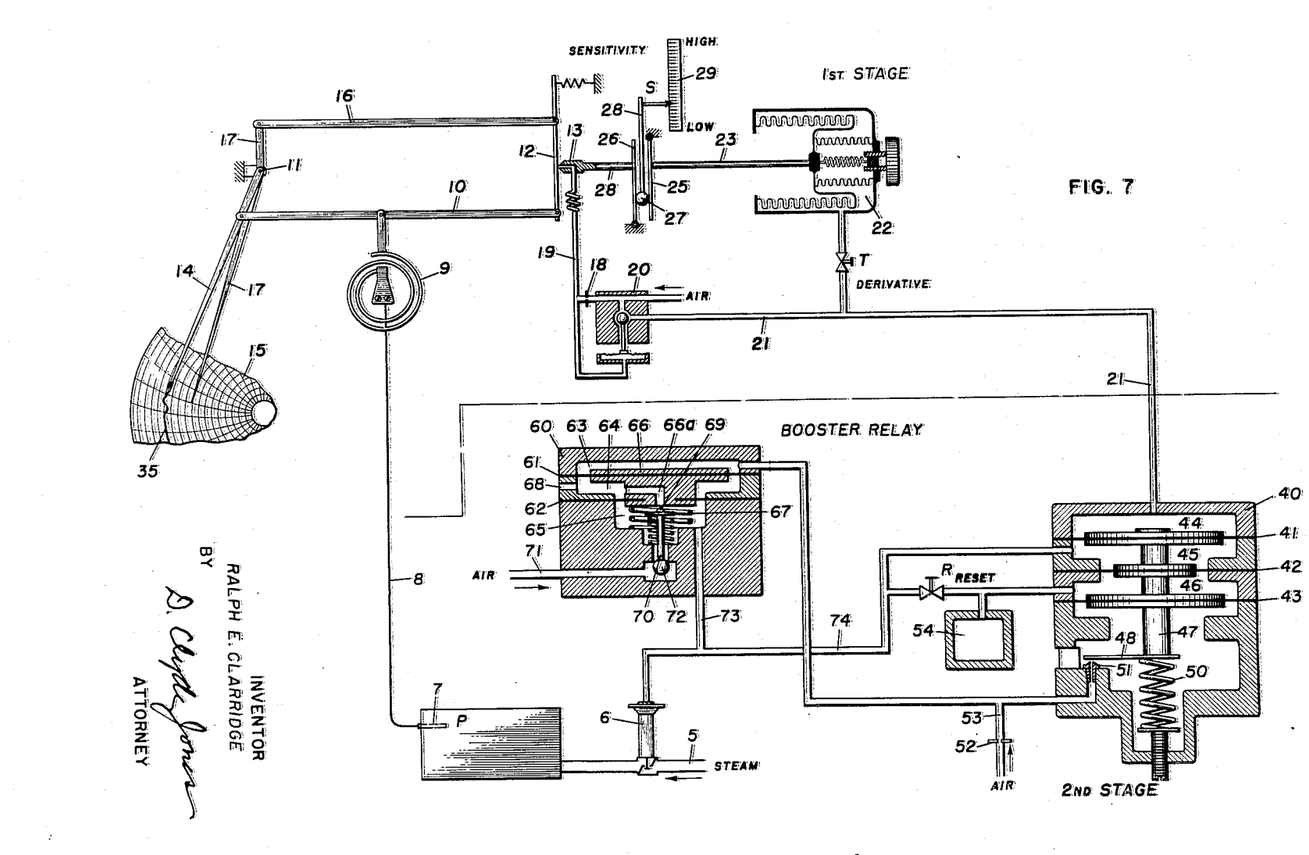
Fig. 7 is a diagrammatic showing of the novel controller of the present invention, the proportional response portion of this controller being of the motion balance type.

Now consider the controller to determine whether its responses can be rearranged to produce more satisfactory results than illustrated in Fig. 6. First, if over-peaking is to be prevented, it is essential that the proportional band must not shift above the control point during the start-up period, as illustrated in Figs. 5 and 6. Since this shifting of the band occurs each time that automatic reset is used in the controller circuits, it is proposed in accordance with the present invention, to separate the pneumatic circuits of the controller into two stages with the proportional and the derivative responses in the first stage as illustrated in Fig. 7. Since automatic reset is always necessary to prevent the off-set due to load change, it is, in accordance with the present invention, incorporated in the second stage of the controller circuits so that it will not disturb the proportional band of the first stage. In as much as the derivative and proportional responses must be transmitted to the diaphragm valve 6, the second stage of the controller circuits must also have a proportional response. In other words, the controller of this invention comprises two stages; the first incorporating proportional plus derivative responses, and the second incorporating proportional plus automatic reset responses. Since two proportional bands exist, this controller can be referred to as a two band controller, the first band being influenced by the derivative response and the second band, being influenced by the automatic reset response.

The first stage of the controller of this invention, Fig. 7, has proportional response plus derivative response and its operation is identical with the operation of the controller shown in Fig. 1. Thus for a decrease in the process temperature, the first stage output pressure increases. This output pressure is fed through the pipe 21 to the second stage which has fixed proportional response plus reset response. The second stage or reset stage comprises a casing 40 which with parallel diaphragms 41, 42 and 43 sealed thereto provides a primary chamber 44, a secondary chamber 45 and a tertiary chamber 46. These diaphragms have the effective areas of the proportions indicated. A pillar 47 connected to the centers of these diaphragms partakes of the resultant movement thereof to move in a vertical direction in response to changes in the pressures in the reset stage. The lower end of the pillar 47 carries a baffle 48 and is biassed upward by a spring 50. The spring 50 is so adjusted that when the reset stage is in its equilibrium condition the spring will balance the pressure in chamber 44 at the midspan position. The right end of the baffle cooperates with a nozzle 51 to constitute a control couple. A source of compressed air under uniform pressure is supplied through restriction 52 and an output pipe 53 to bleed to the atmosphere through the nozzle 51 under control of the baffle 48. As the baffle changes its position with respect to the nozzle 51, the output pressure in the pipe 53 will vary accordingly. This pressure is applied to a booster relay.

The booster relay comprises a casing 60 which with parallel diaphragms 61 and 62 sealed thereto, provides chambers 63, 64 and 65. The diaphragms are connected at their centers by a pillar 66 so that they operate as a unit against the biassing action of spring 67 in response to the difference in pressures applied to their respective surfaces. The pillar 66 has a passage 66a therein leading to chamber 64 which communicates with the atmosphere through an opening 68. Pillar 66 has a valve seat at the entrance to the passage 66a, controlled by a ball valve 69 provided at the upper end of an upwardly spring-biassed valve stem 70 governing the flow of air through the passage. Compressed air from a suitable source is supplied through the pipe 71 into chamber 65 under the control of a ball valve 72 carried on the lower end of the valve stem 70, and cooperating with a seat formed in the bottom cap at the entrance to chamber 65. The pressure in the chamber 65 is applied to the diaphragm 62 tending to oppose the pressure applied to diaphragm 61 comprising a part of the chamber 63. Compressed air is supplied from the chamber 65 through the pipe 73 which communicates with the diaphragm motor of valve 6, to position this valve so that the proper amount of steam is supplied through the pipe 5, to correct any deviation from the desired value of the process. The pressure in the pipe 73 is also applied directly to the chamber 45 and is also applied through a delaying connection including the reset needle valve R and capacity 54, to the chamber 46.

To explain the operation of the controller, assume a decrease in the process temperature which actuates the Bourdon tube 9 through the bulb 7 and capillary 8. The first stage, containing the sensitivity adjustment S and derivative needle valve T, operates as previously described, to furnish an increase in output pressure in the pipe 21 and the chamber 44. This causes the pillar 47 to move downward thereby bringing the baffle 48 closer to nozzle 51. This relative movement of the baffle and the nozzle results in a change in pressure in pipe 53 such that the pressure in the chamber 63 of the booster relay increases. This causes the pillar 66 to move downward tending to move the ball 72 further from its seat with the result that air at an increased pressure is supplied through the booster relay to pipe 73 leading to the motor diaphragm valve 6. Valve 6 tends to open thereby increasing the amount of steam supplied to the process. The pressure in pipe 73 is also supplied through the branch pipe 74 to chamber 45 tending to increase the nozzle-baffle displacement which results in pneumatic sensitivity reduction or feed back action. The pressure in the pipe 74 is also supplied through the reset valve R and capacity 54 to chamber 46 causing the pillar 47 to move downward. This will, as previously explained, cause the output to the control valve 6 to increase. Thus through the action of the reset valve R and chamber 46, the output pressure will continue to increase until the pen returns to the set point. Thus any off-set due to a load change is eliminated. When the process temperature is at the set point, the pressures in chambers 45 and 46 will be equal, the pressure in chamber 44 will be at its midspan value and will be balanced by spring 50, and pillar 47 will be at its normal or equilibrium position. An increase in the process temperature results in a similar operation of the control system but in the reverse sense.

In the form of the invention disclosed in Fig. 7, the first stage therein illustrated above the broken line, is of the motion balance type. However this invention is not so limited but also includes a control system in which the first stage is of the force balance type as disclosed in the modified form shown in Fig. 8. This modified form of the invention, by way of example, comprises a system for the control of temperature of a given process P to which steam is supplied through the pipe 5 under the control of a diaphragm motor valve 6, the valve being controlled by the system to admit the proper amount of steam into the process to maintain it at the desired temperature.

Figure 8:
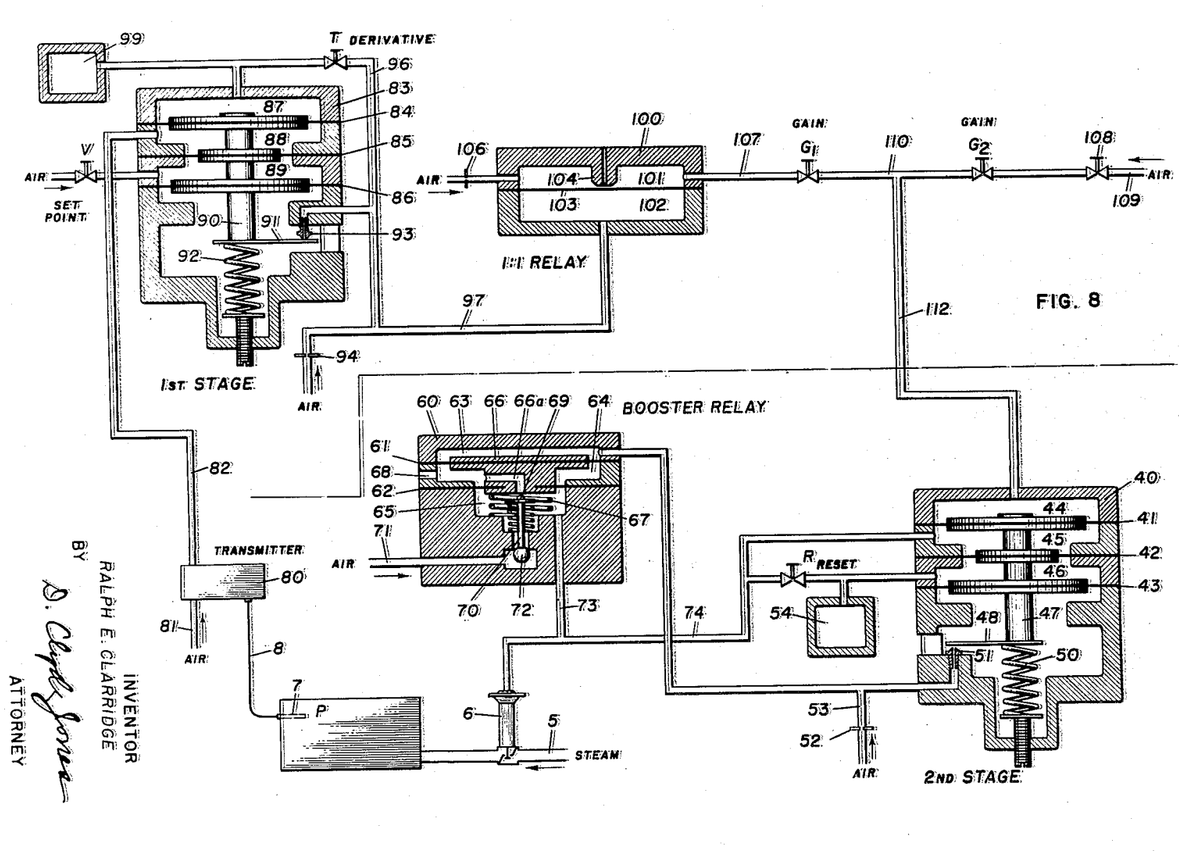
Fig. 8 is a diagrammatic showing of another embodiment of the novel controller of this invention, the proportional response portion thereof being of the force balance type.

The temperature of the process P is sensed by temperature transmitter 80 including a capillary tube 8 of the tube system which terminates in a bulb 7 exposed to the process medium. This transmitter may be similar in construction to that disclosed in the patent application of Matner et al., Serial No. 790,776, filed December 9, 1947, now Patent No. 2,536,198, granted January 2, 1951. The temperature transmitter 80 transmits air or the like under pressure from the source pipe 81, at a signal pressure inversely proportional to the temperature change sensed at the bulb 7. This proportional pressure is communicated through the pipe 82 to the first stage.

The first stage of the system comprises a casing 83 with parallel diaphragms 84, 85 and 86 of the effective areas indicated, sealed at their margins to the inner wall of the casing to define the chambers 87, 88 and 89. The centers of the diaphragm are secured in sealed relation to a pillar 90 to move it up or down depending on the resultant of the forces on the several diaphragms, caused by the pressures in the chambers 87, 88 and 89. The pillar 90 carries the left end of baffle 91 which pillar is normally biased upward by a spring 92. The right end of the baffle cooperates with a nozzle 93 to constitute a control couple. The signal pressure in the pipe 82 is applied to primary chamber 88 and a selected control pressure, which determines the set point or desired temperature of the system, is applied to the secondary chamber 89 through the reducing valve V. A feedback pressure from the output of this first stage, as will be described is applied to the tertiary chamber 87. Fluid under pressure, such as compressed air under uniform pressure, is supplied through restriction 94 and pipe 96, to nozzle 93 where it bleeds to the atmosphere depending on the spacing between the baffle 91 and nozzle 93. This action controls the output pressure in pipe 96 which pressure is fed back through the adjustable restriction or needle valve T, to the tertiary chamber 87, the needle valve T together with the capacity 99, controlling the rate of this pressure feed back to provide proportional response plus derivative response in pipe 97.

Pipe 97 communicates with an isolating one-to-one relay. This relay comprises a casing 100 which is divided into an upper chamber 101 and a lower chamber 102 by a diaphragm 103 which has its margin sealed in the walls of the casing to prevent fluid from passing from one of these chambers to the other. A source of compressed air at uniform pressure is supplied through restriction 106 to the chamber 101 while the controlled pressure in branch pipe 97 from the output of the first stage, is applied to chamber 102. The top of the casing is provided with an inwardly directed nozzle 104 exhausting from chamber 101 to the atmosphere, under the control of the diaphragm 103 which cooperates with the nozzle to vary the escape of fluid therethrough. This relay which serves to prevent the second stage from reacting back on the first stage, functions to deliver to its output pipe 107, compressed air at a pressure equal to that in its input pipe 97.

Output pipe 107 communicates with a pressure dividing network whereby the sensitivity of the system can be adjusted at will. This sensitivity adjusting means determines the amount that the valve 6 opens or closes for any given change in temperature. The network comprises a pipe 110 having the sensitivity or gain restrictions or needle valves G1 and G2 connected therein. The left end of pipe 110 communicates with the output pipe 107 while the right end of pipe 110 communicates with a pipe 109 leading to a separate source of fluid under pressure. The pipe 109 has a manually operated pressure reducing valve 108 therein whereby compressed air at a desired pressure can be delivered to the network.

The pipe 112 which communicates with the pipe 110 at a point between the needle valves G1 and G2 leads to the chamber 44 of the second stage. It will be understood that by appropriate adjustments of the needle valves G1 and G2 any desired fraction of the pressure in the pipe 107 is delivered to the chamber 44 of the second stage. The remaining portion of the modified system shown in Fig. 8 is identical with the corresponding portion shown below between the dotted line of Fig. 7 and the description thereof need not be repeated.

In the system of Fig. 8 an isolating relay has been disclosed to insure that the pressure changes occurring in the pressure dividing network will not react back on the first stage. However, it has been discovered that the pipe 97 can communicate directly with the pipe 107 and yet pressure changes in the pressure dividing network will not re-act back on the first stage if the circuits constants of the pressure dividing network are properly selected.

In the operation of the system of Fig. 8, let it be assumed that the temperature at bulb 7, is stable at the set point, then the signal pressure in pipe 82 and the reference or set point pressure are equal, at which time the pressures in chambers 87, 88 and 89 are equal. Then assume an increase in process temperature at bulb 7 which actuates the transmitter 80 causing it to deliver to the pipe 82 and to chamber 88 a signal pressure inversely proportional to the change in temperature sensed at bulb 7. This decrease in pressure in chamber 88, since it is less than the reference pressure in chamber 89, tends to permit the pillar 90 to move upward thereby bringing baffle 91 closer to the nozzle 93. This movement of the baffle with respect to the nozzle, increases the back pressure in pipe 96 and in the branch pipe 97. The pressure in pipe 96 is applied through needle valve T to chamber 87. The resistance of needle valve T in combination with the capacity of chamber 87 and the external capacity 99, provides a derivative action whereby the pressure in chamber 87 is proportional to the rate of change of signal pressure. The action of chamber 87 operating through the baffle 91 and nozzle 93, further modifies the pressure in the output pipes 96 and 97 so that this pressure is proportional to the change in value of temperature at bulb 7 and is also proportional to the rate of change of this temperature. The pressure in pipe 97 is communicated through the isolating relay to the pressure dividing network. This network supplies to the chamber 44 of the second stage a selected fraction of the pressure in the pipe 97. The second stage together with the remainder of Fig. 8 below the broken line functions in the same manner as the corresponding portion of Fig. 7 and need not be further described.

Figure 9:
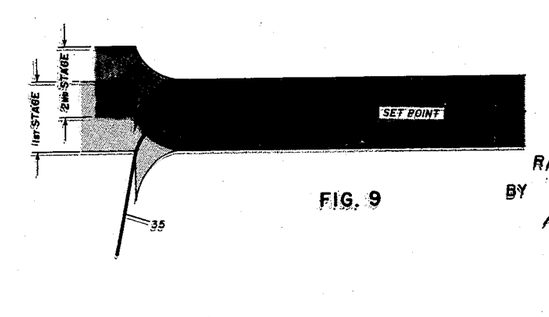
Fig. 9 is a chart useful in illustrating the highly desirable controller results realized by using the novel controller of this invention, such as is illustrated in Figs. 7 and 8.

When using the present improved controller as disclosed in Figs. 7 and 8, the temperature record at the time of start-up might be very similar to that shown in the chart of Fig. 9. Note that each stage, the first incorporating derivative response and the second incorporating reset response, has a separate and non-interacting band. Thus the good features of each can be utilized without any resulting disadvantages. Note also that while the band of the second or reset stage is above the set point, the first stage band is divided by the set point. Thus the output pressure of the first stage in the pipe 21 is throttled as soon as the temperature reaches the bottom edge of the first stage band. Since the first stage includes derivative response the band shifts downward an amount depending upon the setting of needle valve T. The position of the temperature graph 35 within this band is indicative of the output pressure of the first stage of the control system and it can be seen in Fig. 9 that immediately after the temperature enters the band, the output is more than 50% of its full range. Since the output pressure from this portion of the control circuit is now communicated to a relay incorporating reset, this relay is actuated as soon as the pressure reaches 50% of its range and the second stage band begins to shift downward from its previously unfavorable position. As far as the reset action is concerned, the process temperature has apparently reached the set point at the time the output from the first stage reaches its mid-range pressure. Due to the derivative action, it is possible to make this output pressure reach its mid-range position long before the temperature reaches the actual set point. Thus the controller can shift the second stage band downward so that overpeaking is prevented. With this type of controller, both overpeaking and off-set can be eliminated and no manual control is necessary on either start-up or on load changes.

From experience with conventional controllers, it would be expected that on difficult applications the throttling range or proportional band would have to be widened excessively in order to prevent overpeaking, and this in turn would allow the temperature to deviate too much with load changes. However, with the controller of this invention, the sensitivity can be lowered to a value which seems excessive, but it can be shown that this new controller will produce exactly the same responses to load changes as the conventional controller would with its sensitivity set at a considerably higher value. Furthermore, there are new values of the derivative time and the reset rate which must be used if the full benefits of the present control circuit are to be obtained.

Without developing the equation in detail, the controller in Fig. 7 can be described by the following equation:

(6)
$$\frac{dp}{dt} = n(1+R'T')S'\left[\frac{R'}{1+R'T'}(x-x_0)+\frac{dx}{dt}+\frac{T'}{1+R'T'}\frac{d^2x}{dt^2}\right]$$

It will be noted that in Equation 4 $\bar{S}$, $\bar{R}$, and $\bar{T}$ have been used to denote the instrument adjustments in a non-interacting controller. In Equation 5 R, S, and T have been used to denote the controller adjustments in a conventional controller. In Equation 6 R', S', and T', are the adjustments in the controller of this invention while $n$ is the gain in the reset relay, thereof. It should be noted that this gain factor $n$ multiplies the proportional response in the same way that the sensitivity (S) does.

If the present controller, the conventional controller, and the non-interacting controller are to perform in an identical manner in response to load changes, the coefficients of each term in the equation must be equal.

In other words,

| Response | Actual Coefficients | Coefficients in Conventional Controller | Coefficients in Proposed Controller |
|---|---|---|---|
| (7) Proportional | $\bar{S}$ | $=\frac{1+RT}{1-RT}S$ | $=n(1+R'T')S'$ |
| (8) Reset | $\bar{SR}$ | $=\frac{R}{1-RT}S$ | $=nS'R'$ |
| (9) Derivative | $\bar{ST}$ | $=\frac{T}{1-RT}S$ | $=nS'T'$ |

Since we are interested in the dial readings on the new instrument in terms of the dial readings on the old instrument, rather than in terms of the corresponding readings on the non-interacting controller, the last two sections of Equations 7, 8 and 9 may be solved. In solving, a quadratic equation was obtained which has two solutions. The first solution is:

(10) $\quad nS'=\frac{S}{1-RT},\ R'=R$ and $T'=T$ while the second solution is:

(11) $\quad nS'=\frac{RTS}{1-RT},\ R'=\frac{1}{T}$ and $T'=\frac{1}{R}$

These equations are very helpful in adjusting the new controller and in illustrating that every satisfactory adjustment of the conventional controller can be duplicated on the new controller, although the values of the instrument settings may differ considerably.

For example, on a specific problem if the product of the reset rate and preact time (RT) is equal to ¼ when the best possible adjustment of the instrument is obtained, the corresponding settings of the new controller can be obtained from Equations 10 and 11. Specifically, it will be noted that the product of the apparent sensitivity and the gain ($nS'$) in the new controller must be ⅓ greater than the sensitivity reading on the conventional controller if the solution of Equation 10 is accepted. With this solution the reset rate ($R'$) and the derivative time ($T'$) dial readings are identical with those on the conventional controller. These adjustments will produce a performance within the control band which is identical with that of the previous controller. However, Equation 11 proposes another solution in the adjustment of sensitivity, reset rate, and derivative time of the new controller which will also produce identical results within the control band. In the case selected when $RT=¼$ the product of the apparent sensitivity and the gain in the new controller will be ⅓ of the sensitivity of the conventional controller, while the new reset rate setting is the reciprocal of the former derivative time, and the new derivative time setting is the reciprocal of the former reset rate.

Now the first solution (Equation 10) suggests a narrower proportional band than that which existed with the previous controller. However, due to the fact that this proportional band is not shifted by the automatic reset response, the start-up characteristics with the controller adjusted in accordance with this solution are better than those of the conventional controller. The second solution (Equation 11) suggests a much wider proportional band than that which existed with the previous controller. This wide proportional band is extremely helpful during the start-up period, since it enables the derivative response to actuate the balance of the controller long before the control point is reached. In other words, the output of the first stage in the controller has a lead factor with respect to the actual variation of the controlled variable whereby the sensed change in the variable condition effectively appears to take place earlier than it actually did. In this way overpeaking on start-up can be prevented on even the most difficult applications. Therefore, this second solution clearly indicates that even though our proportional band is widened considerably in order to obtain a satisfactory performance on start up, the operation of the controller following a load change need not be impaired.

While this invention has been disclosed in a system of the pneumatic (elastic fluid) type it is also applicable to hydraulic and to electrical systems. It will be understood that the present disclosure is given merely by way of example and that there can be numerous embodiments of the present invention, within the scope of the appended claims, without departing from the spirit of the invention. While an abbreviated mathematical analysis of this invention has been used herein, a more complete development of the mathematics thereof appears in an article printed in the transactions of the American Society of Mechanical Engineers for April, 1951. (Pages 297-305.)

What I claim is:

1. In a system for maintaining a variable condition at a predetermined value, means for sensing the value of the variable condition, means translating the sensed value into a pneumatic signal proportional to the sensed value, a primary unit operated in response to a signal change for delivering elastic fluid under pressure proportional to the magnitude of the signal change and to the rate of change of the signal, a secondary unit including automatic reset mechanism operated responsive to the delivered pressure for supplying elastic fluid under pressure proportional solely to the change in delivered pressure and to the integral with respect to time of said change in pressure of the delivered fluid and responsive to a stabilizing pressure equal to that of the final pressure, and means responsive to the supplied fluid for restoring said condition to said predetermined value.

2. In a system for maintaining a variable condition at a predetermined value, means for sensing the value of the variable condition and for producing a recorded signal proportional to the sensed value, a primary unit including feed back mechanism operated in response to a recorded signal change for delivering elastic fluid under pressure proportional to the magnitude of the signal change and to the rate of change of the signal, a secondary unit including automatic reset mechanism operated responsive to the delivered pressure for supplying elastic fluid under pressure proportional solely to the delivered pressure, to the supplied fluid pressure and to the integral with respect to time of the delivered fluid pressure, and means responsive to the supplied fluid for restoring said condition to said predetermined value.

3. In a system for maintaining a variable condition at a predetermined value, means for sensing the value of the variable condition, means translating the sensed value into a pneumatic signal proportional to the sensed value, a primary unit including feedback means operated in response to a signal change for delivering elastic fluid under pressure proportional to the magnitude of the signal change and to the rate of change of the signal, a secondary unit including automatic reset mechanism operated responsive to the delivered pressure for supplying elastic fluid under pressure proportional solely to the delivered pressure and to the integral with respect to time of the change in pressure of the delivered fluid and to a stabilizing pressure equal to that of the final pressure, and means responsive to the supplied fluid for restoring said condition to said predetermined value.

4. In a system for maintaining a variable condition at a predetermined value, means for sensing the value of the variable condition, means translating the sensed value into a pneumatic signal proportional to the sensed value, a primary unit including feedback means operated in response to a signal change for delivering elastic fluid under pressure proportional to the magnitude of the signal change and to the rate of change of the signal, a secondary unit including automatic reset mechanism operated responsive to the delivered pressure for supplying elastic fluid under pressure proportional solely to the delivered pressure, to the supplied fluid pressure and to the integral with respect to time of the delivered fluid pressure without retrograde influence on said feedback means, and means responsive to the supplied fluid for restoring said condition to said predetermined value.

5. In a system for maintaining a variable condition at a predetermined value, means for sensing deviations in the value of the variable condition and for transmitting a fluid under pressure corresponding to the sensed deviations; a force balance control unit comprising cooperating force responsive members, at least a given one of which is responsive to the pressure of the transmitted fluid, a source of fluid under pressure, a valve actuated jointly by said force responsive members for supplying fluid from said source, in part, responsive to the application of the transmitted pressure to said given member, means including said valve and a connection adjustably restricted for applying the supplied fluid to another of said force members in a direction to oppose the force due to the transmitted fluid under pressure whereby the resultant operation of said valve supplies fluid from said source at a pressure proportional to the sensed deviation and proportional to the rate of change of the sensed deviation, a secondary unit including automatic reset mechanism operated responsive to the supplied pressure for delivering elastic fluid under pressure proportional solely to the supplied pressure, to the delivered fluid pressure and to the integral with respect to time of the supplied fluid pressure, and means responsive to the delivered fluid for restoring said condition to said predetermined value.

RALPH E. CLARRIDGE.

References Cited in the file of this patent

UNITED STATES PATENTS

| Number | Name | Date |
|---|---|---|
| 2,361,885 | Tate et al. | Oct. 31, 1944 |
| 2,409,871 | Krough | Oct. 22, 1946 |
| 2,512,561 | Ziegler | June 20, 1950 |
| 2,520,468 | Moore | Aug. 29, 1950 |

FOREIGN PATENTS

| Number | Country | Date |
|---|---|---|
| 536,537 | Great Britain | May 19, 1941 |